G. BERNERT.
PNEUMATIC GRAIN ELEVATOR.
APPLICATION FILED JUNE 15, 1917.
1,263,364.
Patented Apr. 23, 1918.
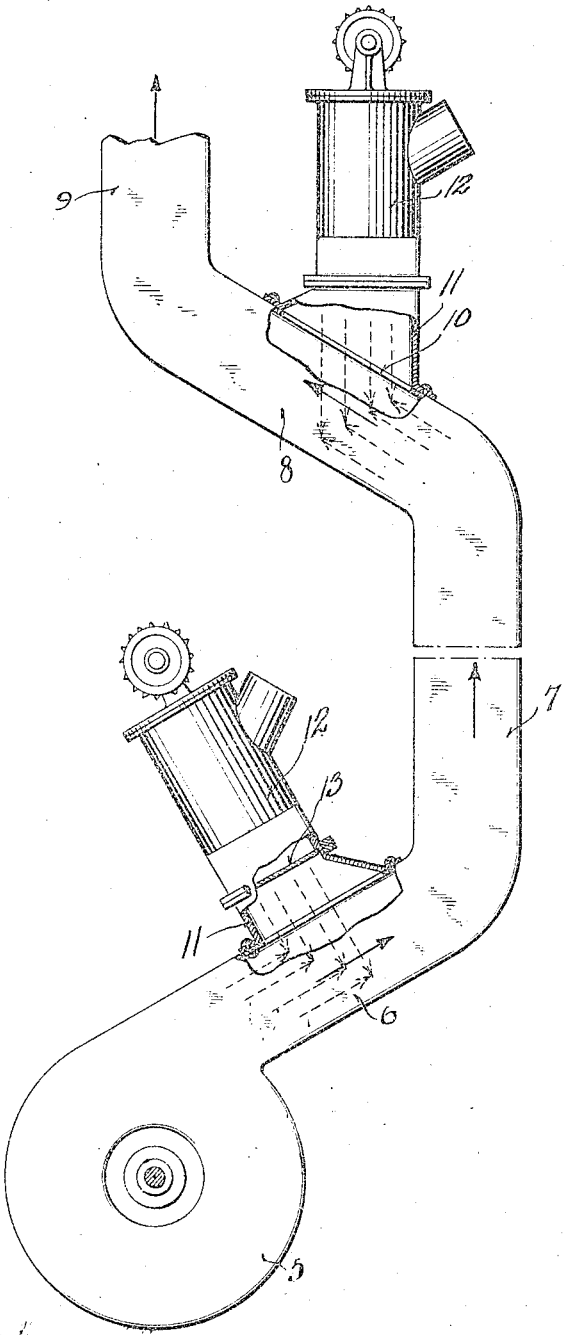

UNITED STATES PATENT OFFICE.

GEORGE BERNERT, OF MILWAUKEE, WISCONSIN.

PNEUMATIC GRAIN-ELEVATOR.

1,263,364.  Specification of Letters Patent.  Patented Apr. 23, 1918.

Application filed June 15, 1917.  Serial No. 174,829.

*To all whom it may concern:*

Be it known that I, GEORGE BERNERT, a citizen of the United States, and resident of Milwaukee, in the county of Milwaukee and State of Wisconsin, have invented certain new and useful Improvements in Pneumatic Grain-Elevators; and I do hereby declare that the following is a full, clear, and exact description thereof.

My invention is directed to new and useful improvements in pneumatic means for elevating grain.

Particularly in view of its conditioning effect upon grain the pneumatic method of elevating grain is very desirable, but a considerable disadvantage heretofore encountered in methods of pneumatic elevating has been the excessive amount of power required to elevate the grain when it is discharged into the conveyer trunk in advance of the fan, and in such instances as when the grain is discharged into the fan an undesired breakage of the grain occurs together with a considerable wear on the fan necessitating frequent replacement of parts.

It is therefore the primary object of my invention to provide an arrangement for feeding grain into a pneumatic conveyer trunk whereby said grain may be elevated by the air in the trunk with a minimum expenditure of power.

I have found that a relatively great amount of power is consumed in carrying grain over a bend in the conveyer trunk, this amount of power being in proportion to the angle of the bend. I have also found that it is impractical to feed grain directly into a vertically disposed conveyer trunk, in view of the excessive lifting load imparted to the mass of air at that side of the conveyer trunk at which the grain is admitted.

It is therefore more specifically the object of my invention to provide an arrangement for introducing grain into a pneumatic elevating trunk in such manner as to involve a minimum loss of power due to changing the direction of the trunk, and yet in such manner as to provide for a proper distribution of the grain transversely of the trunk whereby the initial lifting load imparted to the column of air in the trunk is distributed throughout the transverse area of the trunk.

Essentially my invention consists in introducing grain into an upwardly inclined conveyer trunk portion which is disposed at an obtuse angle to the vertically directed main portion of the trunk, whereby an obtuse bend is provided in the trunk which consumes comparatively little of the conveying power of the column of air and further whereby the vertical gravity-caused movement of the grain traverses the receiving trunk portion whereby to distribute the grain by gravity throughout the entire transverse area of the conveyer trunk portion as the grain enters therein.

The drawing shows an elevating conveyer trunk and fan having a plurality of grain feeding mechanisms associated therewith in accordance with my invention.

Referring now more particularly to the drawing, 5 designates the blower fan, and extending upwardly from this fan at an acute angle to the horizontal plane is a conveyer trunk portion 6 which merges into a vertical conveyer trunk portion 7 which is shown broken in length. This vertical conveyer trunk portion, in the present instance, is shown merging into a second inclined conveyer trunk portion 8, disposed also at an acute angle to the horizontal plane, and this second conveyer trunk portion is merged into a vertical trunk portion 9.

The inclined trunk portions 6 and 8 are provided in their top walls with inlet openings 10, about which are fitted the discharge boots 11 of grain feeding mechanisms 12 preferably of that type including valve gates 13 adapted to be opened upon pressure of grain thereupon whereby to prevent leakage of the conveying column of air. It will, however, be appreciated that any suitable feeding means may be employed which prevents leakage of air. It will be further appreciated that the feeding mechanisms may be arranged in any desired manner to procure discharge through the openings 10, and it is observed that I have shown, in the same figure, two embodiments of my invention adapted for introducing grain into the elevating duct adjacent the fan, and for introducing into the elevating duct at an intermediate point thereof, and that these modifications may be used together or singly.

As shown more particularly by the arrows, the direction of the movement of the grain, under the influence of gravity when discharged into the trunk, traverses said trunk. Thus, as the grain falls into the upper portion of the inclined section 6 or 8 of the trunk, if the current of air in said upper portion of the trunk is not sufficiently strong to start the conveying movement of the grain, the transverse movement of the excess amount of grain over the conveying load of the upper section of air current will continue its transverse movement and will be engaged by an intermediate section of the current. Should the mass of grain be then too great, a portion thereof will fall farther transversely of the trunk so that under maximum feeding conditions the entire transverse area of the column of air in the trunk will be utilized for the conveying load.

In introducing grain into a vertically disposed trunk, the gravity impelled movement of the grain is parallel to the direction of movement of that section of the air current at the side at which the grain is introduced. Thus the gravity load of said section of current being not sufficient to impart an upward conveying movement to the grain, said grain will continue to fall vertically, and the remaining sections of the air current will not be utilized. Thus to insure the conveying movement of the grain, an excessive expenditure of power is necessitated. In discharging grain into the horizontal section of the conveyer trunk, the current of air properly takes up the conveying load of the grain, but a consequent right angular bend must be made to procure elevating movement of the grain. Frictional action set up incidental to this bend necessitates also an excessive expenditure of power.

By my arrangement involving an obtuse angle between the grain receiving portion of the duct and the vertical portion thereof, this excessive expenditure of power is overcome, and the grain is fed into the receiving duct in such manner as to insure a proper distribution of load strain transversely of the air column.

What is claimed:

The combination with a conveyer trunk having two or more vertical portions, inclined trunk portions disposed between and connecting said vertical portions, said inclined portions being disposed at an acute angle to the horizontal and consequently at obtuse angles to the adjacent vertical portions, whereby material may be successively lifted by a series of steps, the angle of the inclination of said inclined portions being between thirty and sixty degrees, said inclined portions each having an inlet opening in its top, a mechanical material feeding means connected with each of said openings in the trunk portions, a blower connected with the lower end to the lowermost trunk portion below the lowermost inlet opening, whereby to force a column of air up said trunk portions to raise material dropped through said inlet openings, and valve means in each of said inlet openings to prevent passage of air therethrough.

In testimony that I claim the foregoing I have hereunto set my hand at Milwaukee, in the county of Milwaukee and State of Wisconsin, in the presence of two witnesses.

GEORGE BERNERT.

Witnesses:
FRANK S. RATCLIFFE,
M. E. DOWNEY.